Jan. 7, 1930.  H. C. COVER  1,742,900
CYLINDER FOR ICE CREAM FREEZERS
Filed Sept. 15, 1927
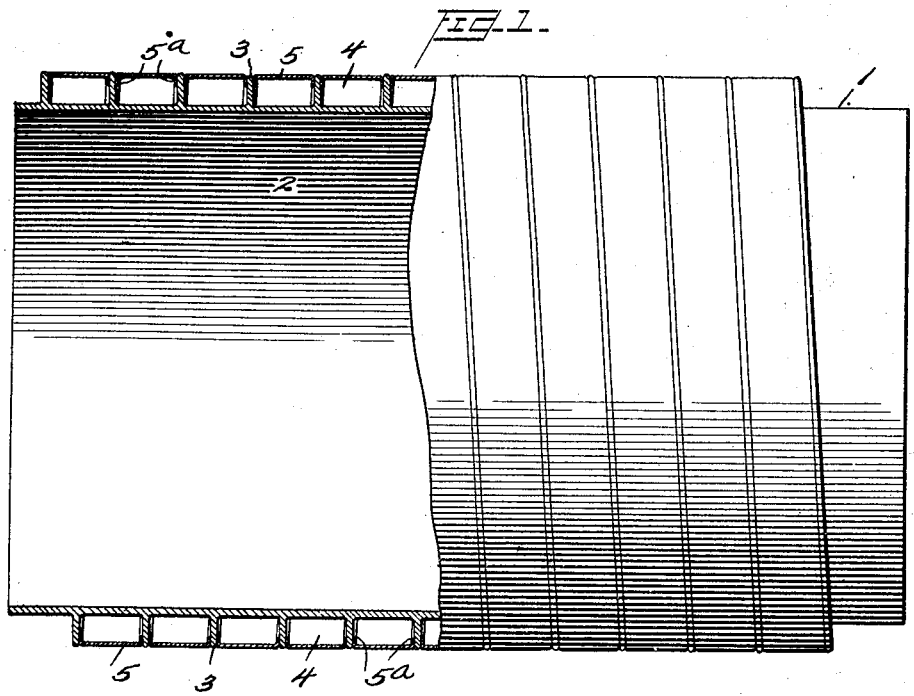
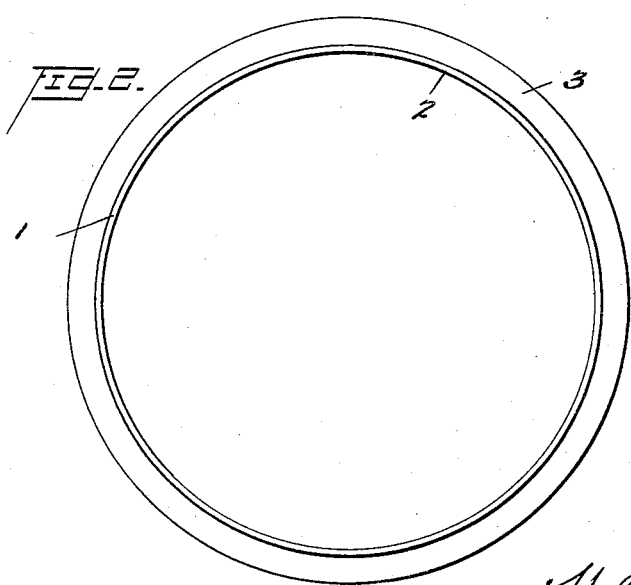
Inventor
H. C. Cover
By Robert Watson
Attorney Patented Jan. 7, 1930

1,742,900

UNITED STATES PATENT OFFICE

HARRY CLEMSON COVER, OF BALTIMORE, MARYLAND, ASSIGNOR OF ONE-HALF TO LIONEL MANUEL HENDLER, OF BALTIMORE, MARYLAND

CYLINDER FOR ICE-CREAM FREEZERS

Application filed September 15, 1927. Serial No. 219,645.

This invention relates to cylinders for ice cream freezers such as are used for manufacturing ice cream commercially, and in which power operated scrapers continuously scrape the frozen material from the inner wall of the cylinder during the freezing process. Such cylinders are usually made of sheet metal, enclosed within an outer casing, the latter having a spiral fin which fits closely around the outer side of the sheet metal cylinder and is secured to it so as to form a spiral channel for the flow of the cooling liquid around and against the cylinder. Scraper blades extend longitudinally within this cylinder and these blades are revolved and scrape the frost from its inner wall as fast as the frost is formed. The cylinder is made of sheet metal in order that the heat from the ice cream mixture will be conducted quickly through its wall; but the interiors of such cylinders are usually found to be out of true in numerous spots of larger or smaller area, owing mainly to warping and distortions which occur in soldering the wall of the cylinder to the spiral fin, and also which occur by reason of the extreme changes in temperature to which the cylinder is subjected in use, the brine which circulates on its outer side having a temperature of −20° F., while the water which is used to clean the interior of the cylinder may have a temperature of 210° F., or thereabout. Hence, as the scraper blades move over the inner surface of a cylinder, they do not engage every part of the surface and frost remains on the low spots of the cylinder wall. Although the skim of frozen material may be very thin in these areas, it retards the freezing of the cream because it forms an insulator which obstructs the conduction of heat through the cylinder wall.

The purpose of my invention is to provide a cylinder for ice cream freezers which will be free from the objections referred to. In order to overcome these objections I make the cylinder of cast metal which may be turned perfectly true on its inner surface, the wall of the cylinder being relatively thin so that the heat may be quickly conducted through it, and the spiral fin which forms a channel for the cooling liquid is cast integral with the cylinder. This fin, which is also relatively thin, strengthens the cast cylinder and forms the sides of the channel for the cooling liquid, and, being integral with the cylinder, no soldering or brazing is required along the cylinder wall. In order to complete the channel for the cooling liquid, a spiral sheet metal strip is arranged between the convolutions of the spiral rib and this strip is soldered or brazed along its marginal edges to the outer part of the fin. In a cylinder thus constructed, the inner surface of the cylinder is true and there can be no leaks between the spiral rib and the cylinder. Also, as the channel is closed by the spiral strip, the soldering operation takes place on the outer side of the cylinder where the surfaces to be soldered are exposed and open to view, and if any leakage occurs from the channel at any time the leakage will be readily detected.

In the accompanying drawings

Figure 1 shows the cylinder of my invention partly in central longitudinal section and partly in side view and Figure 2 is an end elevation of the same.

Referring to the drawing, 1 indicates a cylinder of cast metal, the inner surface 2 of which is machined so as to be as cylindrical as possible, and in this machining operation the wall of the cylinder is made relatively thin, as shown. A spiral fin 3 is cast integral with the cylinder and projects from its outer surface the successive convolutions of the fin forming the side walls of a channel 4 for conveying cooling fluid around the outer surface of the cylinder. This fin is also relatively thin. In order to complete the channel I provide a strip of sheet metal 5 which extends spirally around the cylinder between the convolutions of the fin. Preferably the lateral edges of the strip are flanged inwardly as indicated at 5ᵃ and these flanges fit against the sides of adjacent convolutions of the fin, near the outer edge of the latter. The margins of the strip are secured to the fin by solder which not only holds the strip in position but forms a seal which prevents leakage of the cooling liquid past the strip.

With this construction it will be evident that the heat may pass quickly through the thin cylinder wall to the cooling fluid and that as the inner surface of the cylinder can be made perfectly true the scraper blades will engage every part of said surface and the conduction of heat through the cylinder wall will not be obstructed by frost remaining on low spots on said wall.

It will also be evident that the integral fin strengthens the cylinder wall and prevents leakage of the cooling fluid adjacent said wall and that as the continuous soldered joint between the fin and the sheet metal strip is on the outer surface of the device, the solder can be readily applied and any leakage of the cooling fluid can be instantly detected.

What I claim is:

1. A cylinder for ice cream freezers composed of a cast metal body having a thin wall cylindrical on its inner surface and having an integral spiral fin projecting from its outer surface, and a spiral strip of sheet metal extending around the cylinder between adjacent convolutions of the fin, said strip having flanges along its lateral margins fitting against adjacent convolutions of the fin and soldered thereto.

2. A cylinder for ice cream freezers composed of a cast metal body having a thin wall cylindrical on its inner surface and having an integral spiral fin projecting from its outer surface, forming a spiral channel, and a covering for said channel mounted on the fin.

In testimony whereof I hereunto affix my signature.

HARRY CLEMSON COVER.